March 24, 1936.    F. M. GAMROTH    2,034,804
CALIPER RULE
Filed May 8, 1934
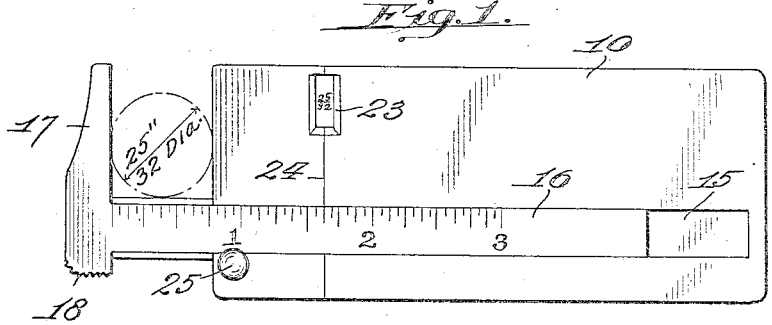
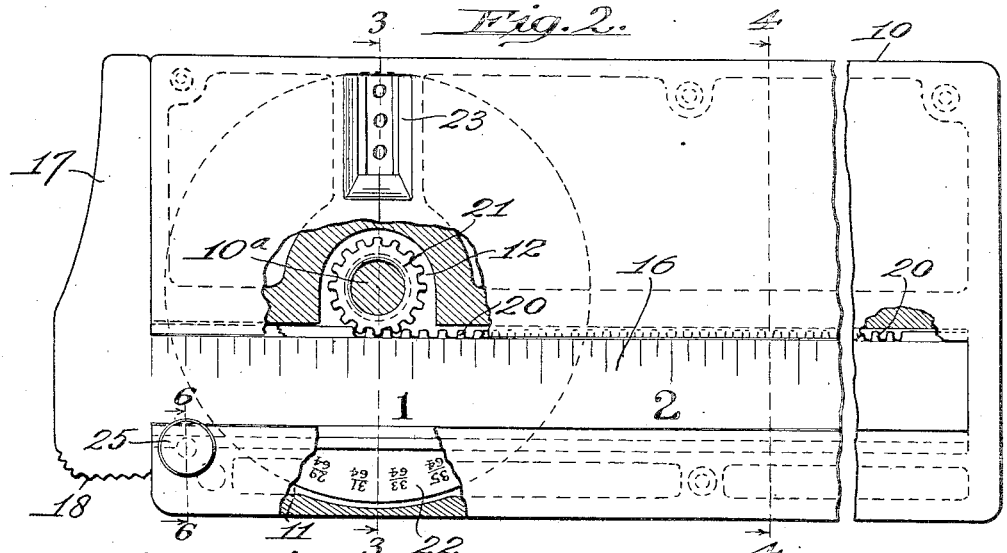
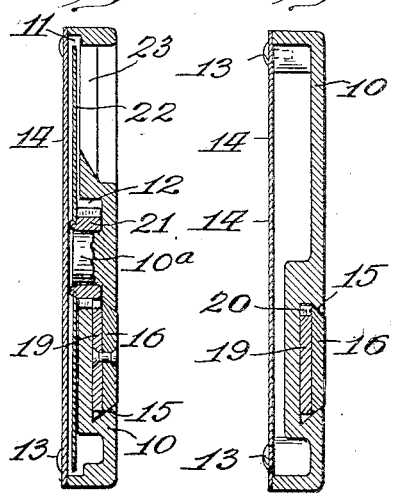 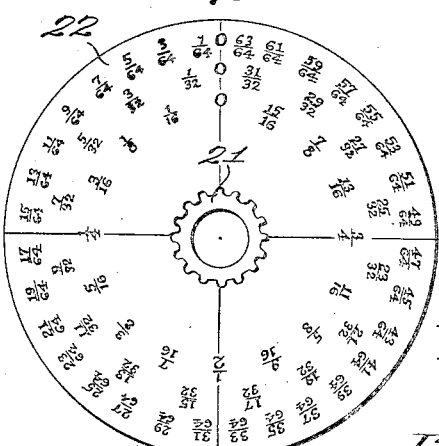
Inventor:
Fritz Max Gamroth
By Martin P. Smith
Attorney Patented Mar. 24, 1936

2,034,804

UNITED STATES PATENT OFFICE 2,034,804

CALIPER RULE

Fritz Max Gamroth, Los Angeles, Calif.

Application May 8, 1934, Serial No. 724,513

4 Claims. (Cl. 33—147)

My invention relates to a caliper rule and has for its principal object, the provision of a relatively simple, practical and efficient device that may be conveniently used for performing the functions of a rule and calipers for obtaining direct readings of sixteenths, thirty-seconds and sixty-fourths of an inch in printed figures that appear one at a time in a window-like opening in the face of the tool while the same is being used.

In the use of an ordinary or standard scale or rule for taking measurements, there is to the average person more or less difficulty in accurately reading the sixteenth, thirty-seconds and sixty-fourths of an inch, due to the multiplicity of the lines on the rule and the reading of the fine lines involves eye strain and waste of time and mistakes are very easily made.

To overcome these disadvantages, I propose to provide a relatively simple and practical device that is a combination of a rule and calipers and which device may be easily and quickly used with michrometer-like accuracy and precision in effecting measurements that involve graduations of a scale up to sixty-fourths of an inch, although if desired it is possible to utilize the same principal for higher graduations.

A further object of my invention is, to provide a device of the character referred to, wherein a disc is rotated by the longitudinal movement of a bar through the body of the device and which disc carries on its face a plurality of concentrically arranged graduated scales and the graduations of which scales appear in succession through a window-like opening that is formed in the body of the device so as to give an accurate reading of the movement of the sliding bar or the distance between a head on the outer end of the sliding bar and the adjacent end of the body of the device while the same is being used in caliper operations.

With the foregoing and other objects in view my invention consists in certain novel features of construction and arrangements of parts that will be hereinafter more fully described and claimed and illustrated in the accompanying drawing in which:

Fig. 1 is a front elevational view of a caliper rule constructed in accordance with my invention.

Fig. 2 is a front elevational view of the caliper rule with parts broken away and in section.

Fig. 3 is a vertical cross section taken on the line 3—3 of Fig. 2.

Fig. 4 is a cross section taken on the line 4—4 of Fig. 2.

Fig. 5 is an elevational view of the face of the disc that bears the graduated scales.

Fig. 6 is an enlarged detail section taken on the line 6—6 of Fig. 2.

Referring by numerals to the accompanying drawing which illustrate a preferred embodiment of my invention, 10 designates an elongated substantially rectangular body preferably formed of light weight cast metal such as aluminum and said body being provided adjacent to its lefthand end and on its rear surface with a circular chamber 11 and a smaller concentric chamber 12.

Applied to the rear face of body 10 and suitably secured thereto, preferably by means of rivets 13, is a thin plate 14, preferably of metal that covers the chambers 11 and 12.

Formed in the lower portion of the front face of the body 10, is a longitudinally disposed dovetail groove 15 and arranged for slight movement therein, is a bar 16, bearing on its front face a graduated scale.

Formed integral with or fixed to the left-hand end of bar 16, is a head 17, the inner edge of which is straight, and adapted to fit against the lefthand end of body 10 while the device is not in use.

The lower edge and the lower outer corner of the head 17 is knurled or corrugated as designated by 18 in order to be firmly engaged by the thumb when said head and bar are manipulated while taking measurements.

The front face of bar 16 is provided with a conventional graduated scale to show inches and divisions thereof.

The upper and lower edges of bar 16 are beveled for engagement with the beveled edges of the groove 15.

Suitably secured to the rear face of bar 16, preferably by means of rivets, is a rack bar 19 that occupies the rear portion of groove 15 and formed in the upper edge of said rack bar is a series of teeth 20 that are cut with a 48 pitch gear cutter and there being exactly 16 teeth to the inch.

Projecting from the front wall of body 10, within chamber 12, is a stud 10ª, upon which is journaled a small gear wheel or pinion 21. This pinion or gear wheel has 16 teeth cut with a 48 pitch gear cutter.

The teeth of this gear wheel or pinion mesh with the teeth on the upper edge of rack bar 19.

The teeth on the rack bar do not extend all the way to the end of the bar opposite the end that is positioned adjacent to head 17 and thus the blank or uncut upper edge of the rack bar at the right hand end thereof provides a stop against which the teeth of the pinion engage to limit the outward movement of bar 16 and rack bar 19.

Suitably secured to the rear face of gear wheel or pinion 21, is a disc 22, preferably formed of thin metal which occupies the chamber 11 in body 10.

Appearing on the front face of disc 22, adjacent its edge, is a graduated scale suitably numbered to indicate sixty-fourths of an inch and just inside this graduated scale is a second concentric graduated scale divided and numbered to indicate thirty-seconds of an inch. Inside the last mentioned scale is a third concentric graduated scale bearing numbers to indicate sixteenths of an inch.

Formed through the upper portion of the front wall of body 10, directly above the chamber 12 and pinion 21, is an opening 23 having beveled side and lower edges that forms a window whereby the graduations and markings of the scales on disc 22 may be readily observed. If desired a thin section of glass or other transparent material may be located in this opening.

Appearing on the front face of the body 10 and intersecting the opening 23 and the groove 15, is a guide line 24 that insures accuracy in reading the numbered graduations on the disc 22 and the front face of bar 16.

A set screw 25 is seated in the front face of the lower lefthand portion of body 10, which set screw carries a fiber disc 26 and the edge of the latter overlies the lower edge of bar 16 so that when the set screw is tightened said bar will be held against longitudinal movement in the body.

In the use of my improved caliper rule, the head 17 on the end of bar 16 may be engaged by the thumb or finger and moved outward in order that the piece of material to be measured may be positioned between the head 17 and the adjacent end of the body.

The head is now moved inward so that the work is engaged by the right hand edge of body 10 and the inner edge of head 17 and the user of the tool now obtains an accurate reading of the diameter of the piece of material or other object by noting the scale graduation numbers that appear through the window 23 in alignment with the guide line 24.

In the operation of the device, it will be understood that as bar 16 and head 17 are moved longitudinally relative to the body, the teeth 20 on the upper edge of rack bar 19 engage and impart rotary motion to gear wheel or pinion 21 and to the disc 22 that is carried by said gear wheel and pinion and the face of which disc bears the graduated scales.

The number and pitch of the teeth on the pinion are such that said pinion and the disc carried thereby make one complete revolution for each one inch movement of the bars 16 and 19 and thus the device may be conveniently employed for accurately performing all caliper operations to obtain the width, thickness or diameter of objects or material positioned between the lefthand end of the body and the head 17.

While the device is not in use, the sliding bars 16 and 19 and head are retained against longitudinal movement relative to the body 10 by means of the set screw 25, which when tightened exerts sufficient pressure against bar 16 to hold same against longitudinal movement.

My improved caliper rule comprises relatively few parts, is very compact, may be conveniently manipulated by one hand and by the arrangement of the three concentric graduated scales on the rotating disc, the graduated marks and numbers of said scales may be very easily read through the window without strain on the eyes and minimizing the possibility of making mistakes in reading the graduations.

Thus it will be seen that I have provided a caliper rule that is relatively simple in construction, inexpensive of manufacture and very effective in performing the functions for which it is intended.

It will be understood that minor changes in the size, form and construction of the various parts of my improved caliper rule may be made and substituted for those herein shown and described without departing from the spirit of my invention, the scope of which is set forth in the appended claims.

I claim as my invention:

1. In a caliper rule, a body provided in its front face with a longitudinally disposed groove, the edges of which are beveled inwardly, a bar arranged for sliding movement in said groove, the edges of which bar are beveled so as to engage the beveled edges of said groove, a head carried by one end of said sliding bar, a separately formed rack bar secured to the rear face of said sliding bar and occupying the rear portion of the groove in the body said body being provided with a pair of chambers of different sizes and having communication with each other, a pinion mounted for rotation within the smaller chamber, the teeth of which pinion engage the teeth of said rack bar, a disc carried by said pinion and occupying the larger chamber within this said body, the face of which disc bears a graduated scale and said body provided with a window that communicates with the larger chamber in said body through which window the graduations of the scale on said disc are visible.

2. In a caliper rule, a body provided with a pair of chambers of different sizes, said chambers having communication with each other, there being an opening formed in the body above the smaller chamber therein, which opening communicates with the larger chamber in said body, said body being provided in its front face with a longitudinally disposed groove that communicates with the small chamber in the body, a bar arranged for sliding movement in said groove, a head carried by one end of said bar, a rack bar secured to the rear face of said sliding bar and occupying the rear portion of the groove in said body, a pinion mounted for rotation within the smaller chamber in the body, the teeth of which pinion engage the teeth of said rack bar, a disc carried by said pinion and positioned within the larger chamber in the body and the face of which disc bears a graduated scale that is visible through the opening in said body.

3. In a caliper rule, a body provided with a pair of chambers of different sizes, said chambers having communication with each other, there being an opening formed in the body above the smaller chamber therein, which opening communicates with the larger chambers in said body, said body being provided in its front face with a longitudinally disposed groove that communicates with the small chamber in the body, a bar arranged for sliding movement in said groove, a head carried by one end of said bar, a rack bar secured to the rear face of said sliding bar and occupying the rear portion of the groove in said body, a pinion mounted for rotation within the smaller chamber in the body, the teeth of which pinion engage the teeth of said rack bar, a disc carried by said pinion and positioned within the larger chamber in the body, the face of which disc bears a graduated scale that is visible through the opening in said body and means seated in the body for locking the sliding bar to said body in differently adjusted positions.

4. In a caliper rule, an elongated rectangular body provided in its front face with a longitudinally disposed groove, the edges of which are beveled so as to engage the beveled edges of the groove, a head carried by one end of said sliding bar, the length of which body and the groove therein are such that the sliding bar is wholly contained within the body when the head on the end of the bar is positioned directly against the end of the body, a separately formed rack bar secured to the inner face of the sliding bar, said body being provided with a pair of chambers of different sizes and with an opening that communicates with the larger chamber in the body, a pinion mounted for rotation on the body and occupying the smaller one of the chambers therein, a disc carried by said pinion and occupying the larger one of the chambers in the body and the face of which disc bears a graduated scale that is visible through the opening in said body.

FRITZ MAX GAMROTH.